United States Patent [19]

Bernard

[11] Patent Number: 5,762,401

[45] Date of Patent: Jun. 9, 1998

[54] LOCKING DEVICE FOR A MOVABLE ELEMENT OF AN AUTOMOBILE VEHICLE SEAT WITH LOCKING INDICATION

[75] Inventor: Vincent Bernard, Anould, France

[73] Assignee: Bertrand Faure Equipements S.A., Boulogne Cedex, France

[21] Appl. No.: 762,241

[22] Filed: Dec. 9, 1996

[30] Foreign Application Priority Data

Dec. 19, 1995 [FR] France .................................. 9515856

[51] Int. Cl.$^6$ .................................................. B60N 2/36
[52] U.S. Cl. ........................ 297/378.13; 297/378.12; 297/378.1; 296/63; 296/68.1; 296/65.1
[58] Field of Search ................ 297/378.13, 378.12, 297/378.1; 70/432, 261; 296/63, 68.1, 65.1; 116/279, 285, 303

[56] References Cited

U.S. PATENT DOCUMENTS

| 4,561,694 | 12/1985 | Mouri et al. | 297/378.13 |
| 4,636,005 | 1/1987 | Bolz et al. | 297/378.13 |
| 4,637,648 | 1/1987 | Okino et al. | 297/378.13 |
| 4,684,175 | 8/1987 | Trutter | 297/378.13 |
| 4,721,338 | 1/1988 | Kondo | 297/378.13 |
| 4,779,927 | 10/1988 | Trutter et al. | 297/378.13 |
| 4,881,767 | 11/1989 | Kondo | 297/378.13 X |
| 4,904,003 | 2/1990 | Yamakazi et al. | 297/378.13 X |
| 4,909,571 | 3/1990 | Vidwans et al. | 297/378.13 X |
| 5,398,995 | 3/1995 | Hurite | 297/378.1 X |
| 5,582,453 | 12/1996 | Leuchtmann et al. | 297/378.13 X |

FOREIGN PATENT DOCUMENTS

| 2720985 | 12/1995 | France . |
| 34 21 561 | 12/1985 | Germany . |
| 59-149833 | 8/1984 | Japan . |

Primary Examiner—Jose V. Chen
Assistant Examiner—Rodney B. White
Attorney, Agent, or Firm—Pollock, Vande Sande & Priddy

[57] ABSTRACT

This device includes a locking component (2) attached to an element of the vehicle, for example, the inner wall of the boot, and penetrating, in locked position, into a window (12) of a second element, for example the folding backrest (1) of a rear seat, to be held in this position by a lock (3).

The said second element includes a locking indication aperture (54) and a pivoting lever (5) returned by a spring (56) to a stable position where an end area (59) of the lever, visible in the indication window, indicates absence of locking, the said lever (5) being positioned so as to be moved out of the said stable position by the locking component when the latter is in locked position.

8 Claims, 2 Drawing Sheets

LOCKING DEVICE FOR A MOVABLE ELEMENT OF AN AUTOMOBILE VEHICLE SEAT WITH LOCKING INDICATION

FIELD OF THE INVENTION

This invention concerns a device for locking a movable element of an automobile vehicle seat onto a fixed element, such as locking the folding backrest of the rear seat in raised position.

BACKGROUND OF THE INVENTION

Folding down the backrest onto the seat especially enables objects larger than the trunk of the vehicle to be loaded into the boot. We already know of fully or partially foldable backrests such as the backrests usually called "1/3–2/3".

Generally speaking, such locking devices must ensure automatic locking when the backrest is raised; unlocking being achieved by a control means such as a button.

Commonly known locking systems include a hook attached to the bodywork inside the trunk and a movable spring-return locking element, installed on the backrest, which latches onto the hook when the backrest is raised. An unlocking control element, for example a button also installed on the backrest enables the locking element to be disengaged from the hook, to unlock the backrest.

A locking system such as this is notably described in French Patent application FR-A-2.720.985. In this system, the hook penetrates, when the backrest is raised, into a window in the rear wall of the backrest, and the locking element consists of a wire ring, elastically deformable, placed behind this window and onto which the hook latches to ensure locking.

For current use of a vehicle equipped with a rear seat with a folding backrest, the backrest must be correctly locked to prevent it from inadvertently folding down and placing the user in danger subsequent to the intrusion of luggage into the vehicle's passenger compartment. It is therefore advisable to be able to easily ensure that the backrest has been effectively locked.

In the system described in the above mentioned document, the unlocking button is connected to the ring and is exposed from the backrest when the ring is not deformed, that is when it is in unlocked position, the hook in this case not being inserted in the window. When the hook starts to engage in the window in the backrest, it pushes back the locking element and retracts the button connected to it inside the well guiding this button until the hook reaches locking position where the locking element returns elastically into a slot in the hook. The various elements are designed so that in this locking position, the button is not exposed by the backrest.

However, in the intermediary position, where the hook pushes back the locking element and before it returns to locked position, the button also is no longer visible. Thus, the fact that the button is visible indicates that locking is not effective, but, the fact that the button is not visible does not guarantee that locking has been correctly achieved. The indication given by the visibility of this button or not is therefore not sufficiently reliable.

A similar problem exists in all cases where the unlocking control element is not connected to the locking element and where it returns elastically into position when released, as the position of this control element is the same whether locking is effective or not.

BRIEF DESCRIPTION OF THE INVENTION

The purpose of this invention is to solve these problems and aims particularly in ensuring a reliable indication of non-locking or of incomplete locking.

With these targets in mind, the subject of the invention is a device for locking a movable element of an automobile vehicle seat onto a fixed element, this device including a locking component attached to the first of the said elements and penetrating, in locked position, into a window made in the second element, and a movable lock attached to the second element and adapted to mate, in locked position, with the said locking component, characterised in that the said second element includes a locking indication aperture and a pivoting lever returned by a spring to a stable position in which an end area of the lever is visible in the said aperture and indicates absence of locking, the said lever being positioned so that it will be moved out of the stable position by the locking component when the latter is in locked position.

Thus, in its rest position, returned by the spring, the lever makes the area visible in the indication aperture, and it is only when the lever is pushed back by the locking component that this area disappears from the aperture.

To provide a more efficient indication, the end area of the lever visible in rest position, that is in the unlocked position of the seat element, will have a bright color, contrasting with the colour around the aperture.

According to a preferential arrangement, the lever includes an arm located opposite the window in a position such that the return spring applies the arm against the front end of the locking component, in locked position. Thus, the lever ensures not only an unlocking indication, but also, provided that the return spring is correctly sized, it ensures that the locking component is positively ejected when the lock is disengaged. This arrangement is especially useful where two locking devices not simultaneously, are installed on the same element of the seat, for example, in the case of a single-piece folding backrest called backrest 1/1, to avoid unwanted relocking of the first unlocked device when the user moves to unlock the second device. Moreover, the constant pressure exerted by the lever on the locking component, in locked position, eliminates any possible play and unwanted noises.

Other characteristics and advantages will appear in the description which will be given as an example of a locking device in compliance with the invention, used for the unlocking of the backrest of the rear seat of the car. Refer to appended drawings on which:

DETAILED DESCRIPTION OF THE INVENTION

Figure 1:
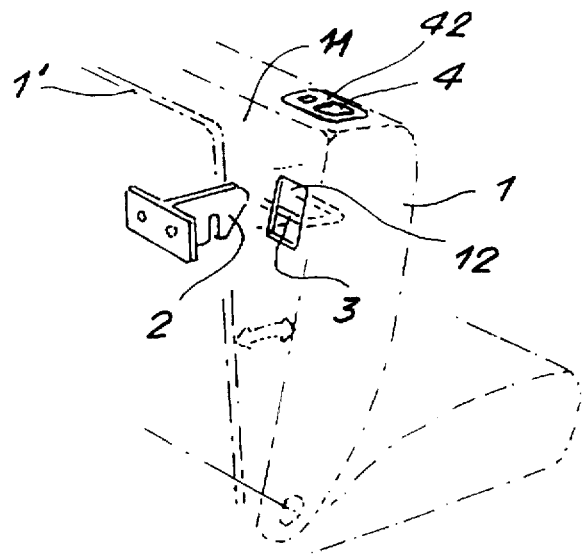
FIG. 1 shows a partial 3/4 rear view of a seat with a folding backrest equipped with a locking device in compliance with the invention.

The drawing of FIG. 1 shows in dotted lines the seat and its folding backrest 1, and the locking component consisting here of a hook 2, attached, for example, to an inner wall 13 of the trunk of the vehicle. The backrest 1 is shown in a partially tipped position, therefore unlocked, the line 1' representing the position of the rear wall 11 of this backrest in the normal position, that is locked.

This wall 11 includes a window 12 behind which, in the thickness of the backrest, is placed a lock ring 3, and into which hook 2 is inserted when the backrest is raised.

Figure 2:
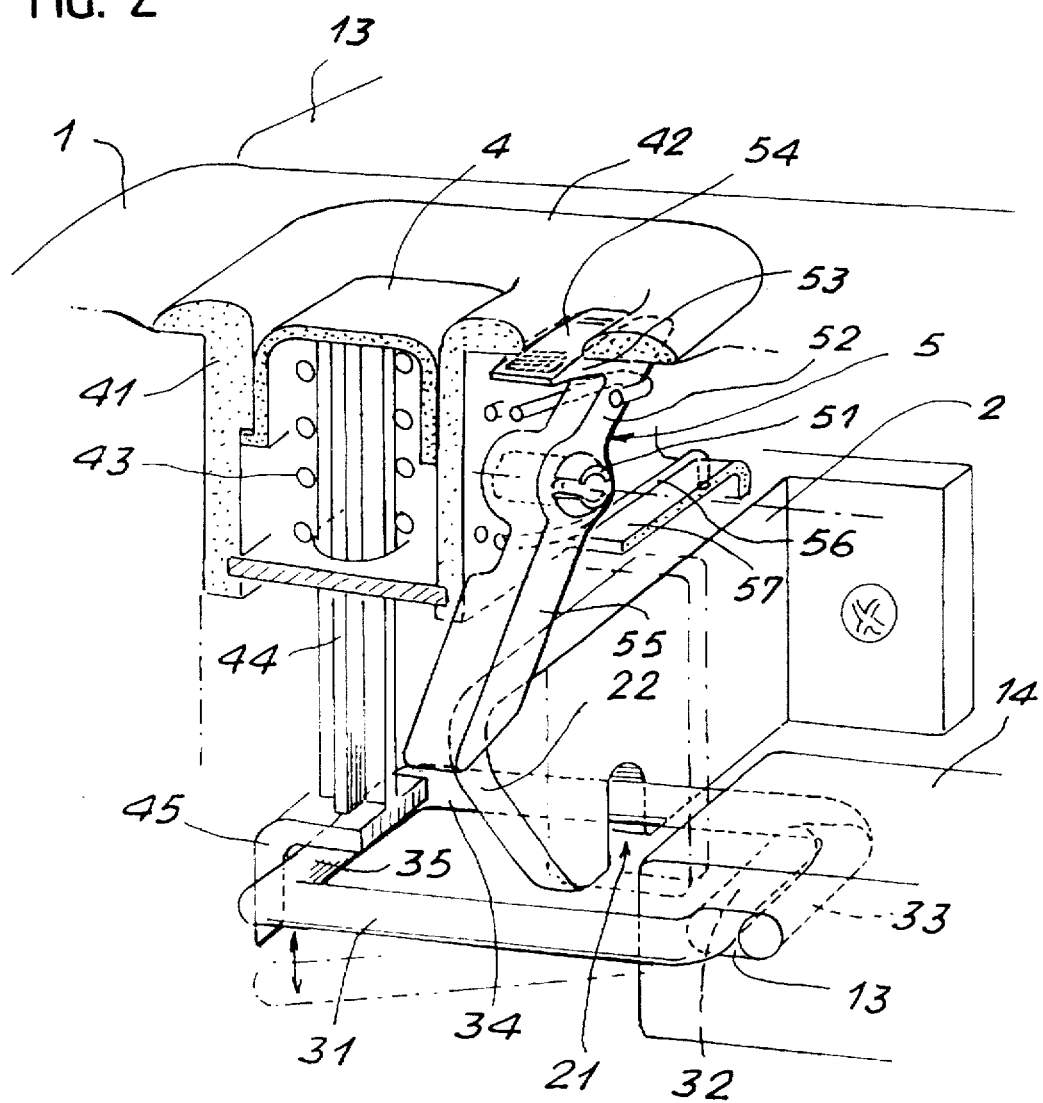
FIG. 2 shows a front perspective with a partial section of the device.

As we can see better on FIG. 2, this lock consists here of a metal wire formed into a ring 31, the ends 32, 33 of which are positioned parallel to each other and offset. These ends 32, 33 are held in an oblong hole 13' of a support 14 attached to the backrest 1. One side 34 of the ring extends against the wall 11, through the window 12, and engages, in locked position, in a notch 21 of the hook, thus preventing the extraction of the hook outside of the window.

As can be easily understood, pressing on the edge 35 of the ring opposite the ends 32, 33 causes an elastic deformation of the ring and a downwards movement of the side 34 which disengages from the notch 21 in the hook to free the latter.

The front end 22 of the hook 2 is inclined to push the side 34 of the ring 3 downwards when the hook 2 is inserted in the window, to ensure automatic locking when this side 34 can return to its stable position, by the elastic return action of the ring, by entering the notch 21. For further details concerning a locking system of this type and its advantages, one can refer to the above mentioned French patent application FR-A-2.720.985.

The unlocking control consists of a pushbutton 4 sliding in a guide well 41 and a cover 42 attached to the backrest 1 and placed on its upper edge. A return spring 43 pushes the button 4 upwards, substantially flush with the upper end of the well 41. The pushbutton 4 includes a rod 44 whose lower end 45 is shaped to bear on the edge 35 of the ring 3.

A lever 5 is installed so that it pivots on a trunnion 51 attached to the well 41 and with its axis parallel to the wall 11, therefore perpendicular to the insertion direction of the hook 2.

In the example shown, this trunnion is located at an intermediary level between the area where the hook penetrates and the upper edge of the backrest, and the lever 5 is shaped like a rocker including two arms extending on either side of the axis of rotation. A first arm 52 extends upwards to the lower surface of the cover 42, and is terminated by a tab 53 with a cylindrical surface, partially visible in an aperture 54 made for this purpose in the cover 42.

A second branch 55 of the lever 5 extends downwards in front of the insertion area of the hook 2, and is shaped so as to make contact with the end 22 of the hook when it is inserted in the window 12. A return spring 56 is positioned so as to maintain the lever 5 in a rest position, where the arm 55 bears against a stop 57 attached to the framework of the backrest or to the well 41. Note that the return spring 56 is sized so as to exert on the lever 5 a moment sufficient to push back the hook 2, and therefore to pivot the backrest 1 counteracting its own weight and the loads which may normally be exerted on this backrest.

Figure 3:
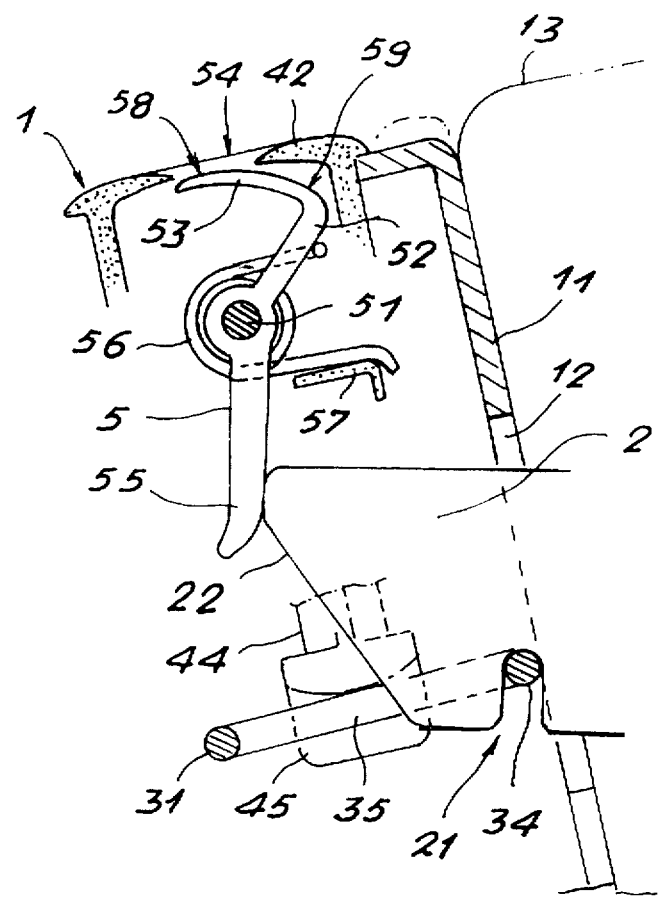
FIG. 3 is a partial side view showing the relative layout of the various parts used to indicate locking.

When the hook 2 is inserted in the window 12, its front end comes into contact with the branch 55 of the lever 5 causing it to pivot, against the return moment exerted by the spring 56, until it takes up the position shown on FIGS. 2 and 3. In this position, only an area 58 of the surface of the tab is visible in the aperture 54, this area 58 preferably having a color similar to that of the cover.

Contrary to that, when the lever is in the rest position, a second area 59 on the surface of the tab 53, colored brightly and contrasting with that of the cover, appears in the aperture 54.

This rest position is obtained whenever locking is not effective, as the moment exerted by the spring not only tends to return the lever to this position but, in addition, is sufficient to push back the hook until the lever reaches this rest position. The area 59 is therefore clearly visible in the aperture, except if locking is effectively ensured.

Figure 4:
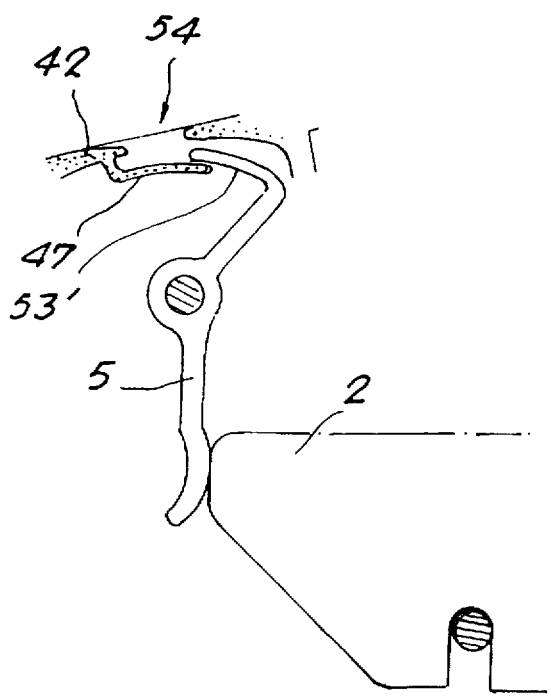
FIG. 4 shows a preferential design variant of the end of the lever and of the indication aperture.

The drawing of FIG. 4 shows a design variant for the lever 5, where the tab 53' is shorter than in the previous example, so that it is not at all visible in the aperture 54, when the lever 5 is pushed back into locked position by the hook 2. The cover 42 includes a masking plate 47 which extends under the aperture 54, at a distance sufficient so that the tab can pass between the masking plate and the window when the lever 5 is returned to its rest position. The lever and its tab can then be one piece, and brightly colored. In unlocked position, the bright color of the tab 53' is clearly visible in the aperture of the cover 42. In locked position, the tab totally disappears from the aperture, and only the masking plate is visible but is not seen as made in one piece with the cover and having the same color.

The invention is not limited to the device described above as an example. It applies to all other types of locking where a locking component attached to an element enters into a window in the other element, the two said elements being attached to each other by locking. In particular, the lock in the example described above may be replaced by any other locking element adapted to act on the locking component which may itself be of a form other than the hook given as an example.

The lever and also its return spring may be shaped differently provided that these elements ensure simultaneously the locking indication and the locking component ejection functions when the locking component is not undoubtedly locked.

I claim:

1. Device for locking a movable element of an automobile vehicle seat onto a fixed element, the device comprising: a locking component attached to a first one of the elements and penetrating, in a locked position into a window made in a second one of the elements, and a movable lock attached to the second element and adapted to mate in locked position, with the locking component, wherein the second element includes a locking indication aperture and a pivoting lever returned by a spring to a stable position in which a lever end zone is visible in the indication aperture and indicates absence of locking, the lever being positioned so that it will be moved from the stable position by the locking component when the locking component is in locked position.

2. Device in accordance with claim 1, further wherein the lever includes an arm located opposite the window in a position so that the return spring applies the arm against a front end of the locking component, in locked position.

3. Device in accordance with claim 2, further wherein the spring is sized so that a load exerted by the arm on the locking component is sufficient to push back the locking component until the lever is in the stable position.

4. Device in accordance with claim 1, further wherein the second element includes an unlocking button acting on the lock and installed so that it slides in a button guide well, and the lever is hinged on a pin attached to the well.

5. Device in accordance with claim 4, further wherein the button is returned by a return spring into a stable position where it is flush with an upper end of the well.

6. Device in accordance with claim 1, further wherein the end zone of the lever is made on a surface of a tab at an end of an arm of the lever and has a color contrasting with part of the second element surrounding the aperture.

7. Device in accordance with claim 1, further wherein the end zone of the lever consists of a tab made from a single piece with the lever and integrally colored with a color contrasting with part of the second element surrounding the aperture.

8. Device in accordance with claim 1, further wherein the first element is an inner wall of a trunk of the vehicle and the second element a folding backrest of a rear seat.

* * * * *